United States Patent
Davey et al.

(10) Patent No.: US 8,067,518 B2
(45) Date of Patent: Nov. 29, 2011

(54) POLYMERS MADE WITH METALLOCENE CATALYSTS, FOR USE IN ROTOMOLDING AND INJECTION MOLDING PRODUCTS

(75) Inventors: Christopher R. Davey, Houston, TX (US); James M. Farley, League City, TX (US); Rainer Kolb, Kingwood, TX (US); Mark P. Ossowski, Bridgewater, NJ (US)

(73) Assignee: Univation Technologies, LLC, Houston, TX (US)

( * ) Notice: Subject to any disclaimer, the term of this patent is extended or adjusted under 35 U.S.C. 154(b) by 293 days.

(21) Appl. No.: 11/811,015

(22) Filed: Jun. 7, 2007

(65) Prior Publication Data

US 2008/0045679 A1 Feb. 21, 2008

Related U.S. Application Data

(60) Provisional application No. 60/816,840, filed on Jun. 27, 2006.

(51) Int. Cl.
*C08F 4/76* (2006.01)
*C08F 210/02* (2006.01)
*C08F 210/06* (2006.01)
*C08F 210/08* (2006.01)
*C08F 210/14* (2006.01)
*C08F 210/16* (2006.01)

(52) U.S. Cl. ........ 526/348; 526/183; 526/185; 526/188; 526/190; 526/192; 526/226; 526/348.1; 526/348.2; 526/348.6; 526/943

(58) Field of Classification Search .......... 526/348, 526/348.2, 348.6, 90, 170, 237, 943, 183, 526/185, 188, 190, 192, 226, 348.1
See application file for complete search history.

(56) References Cited

U.S. PATENT DOCUMENTS 5,015,511 A * 5/1991 Treybig et al. ............ 428/34.1
(Continued)

FOREIGN PATENT DOCUMENTS

EP 0342032 11/1989
(Continued)

OTHER PUBLICATIONS

Davey et al., Paper given at presentation "*Engineered Catalyst for Controlled Bimodal Structures in UNIPOL Single Reactor Gas Phase Polyethylene.*" (Feb. 25-27, 2002), Houston, TX.

(Continued)

*Primary Examiner* — Vasu Jagannathan
*Assistant Examiner* — Richard A Huhn

(57) ABSTRACT

Ethylene alpha-olefin copolymers formed by contacting at least one supported metallocene catalyst, ethylene, and an alpha-olefin in a gas phase reactor are disclosed. In some embodiments, the polymer may have: a density of between 0.890 and 0.970 g/cc; a melt index of between 0.7 and 200 dg/min; a melt index ratio of less than 30; an ESCR value of greater than 1000 hours; and a 1% secant modulus of greater than 75,000 psi. In other embodiments, the polymer may have: a density of between 0.930 g/cc and 0.970 g/cc; a melt index of between 10 dg/min and 200 dg/min; a melt index ratio of between 10 and 25; a part weight of greater than 3 g and a part length of greater than 38 cm in a spiral flow test, and; a zero shear viscosity of less than 150 Pa·s. Processes to produce these polymers are also disclosed.

33 Claims, 1 Drawing Sheet

U.S. PATENT DOCUMENTS

| | | | | |
|---|---|---|---|---|
| 5,278,119 | A * | 1/1994 | Turner et al. | 502/155 |
| 5,863,853 | A * | 1/1999 | Vaughan et al. | 502/108 |
| 6,159,617 | A * | 12/2000 | Foster et al. | 428/523 |
| 6,339,134 | B1 | 1/2002 | Crowther et al. | |
| 6,448,341 | B1 | 9/2002 | Kolthammer et al. | 525/240 |
| 6,914,027 | B2 | 7/2005 | Patrick et al. | |
| 6,987,152 | B1 | 1/2006 | Eisinger et al. | 526/77 |
| 7,323,526 | B2 * | 1/2008 | Agapiou et al. | 526/166 |
| 7,381,783 | B2 * | 6/2008 | Loveday et al. | 526/352 |
| 2003/0088038 | A1 * | 5/2003 | Vaughan et al. | 526/114 |
| 2003/0194575 | A1 | 10/2003 | Tau et al. | 428/515 |
| 2004/0254312 | A1 * | 12/2004 | Mawson et al. | 526/90 |
| 2005/0054791 | A1 | 3/2005 | Nowlin et al. | 526/116 |
| 2005/0058847 | A1 * | 3/2005 | Szul et al. | 428/523 |
| 2005/0137364 | A1 | 6/2005 | Cai et al. | |
| 2005/0288443 | A1 | 12/2005 | Mavridis et al. | 525/240 |
| 2008/0021183 | A1 * | 1/2008 | Graham et al. | 526/154 |

FOREIGN PATENT DOCUMENTS

| | | |
|---|---|---|
| EP | 1153948 | 11/2001 |
| EP | 1300240 | 4/2003 |
| EP | 1416001 | 5/2004 |
| WO | 96/00245 | 1/1996 |
| WO | 99/29737 | 6/1999 |
| WO | 03/008468 | 1/2003 |
| WO | 03/093332 | 11/2003 |
| WO | 2004/000919 | 12/2003 |
| WO | 2006/120418 | 11/2006 |

OTHER PUBLICATIONS

Davey et al., Slides at presentation "*Engineered Catalyst for Controlled Bimodal Structures in UNIPOL Single Reactor Gas Phase Polyethylene.*" (Feb. 25-27, 2002), Houston, TX.

Davey et al., Paper given at presentation "*Univation Technologies' Advanced Catalysts for BOCD LLDPE Beyond Conventional Structure-Property Concepts.*" (May 13, 2004), Houston, TX.

Davey et al., Slides at presentation "*Univation Technologies' Advanced Catalysts for BOCD LLDPE Beyond Conventional Structure-Property Concepts.*" (May 13, 2004), Houston, TX.

Farley et al., Paper given at presentation "*Metallocene-Catalyzed Polyethylenes for the Global LLDPE Markets.*" (2005), Houston, TX.

Farley et al., Slides at presentation "*Metallocene-Catalyzed Polyethylenes for the Global LLDPE Markets.*" (2005), Houston, TX.

* cited by examiner

POLYMERS MADE WITH METALLOCENE CATALYSTS, FOR USE IN ROTOMOLDING AND INJECTION MOLDING PRODUCTS

CROSS REFERENCE TO RELATED APPLICATIONS

This application claims the benefit of Ser. No. 60/816,840, filed Jun. 27, 2006, the disclosure of which is hereby incorporated by reference in its entirety.

FIELD OF THE INVENTION

The invention relates generally to a process for polyolefin manufacturing in gas-phase fluidized bed polymerization reactors and polyolefins manufactured therefrom.

BACKGROUND

Recent advances in polymerization and catalysis have resulted in the ability to produce many new polymers having improved physical and chemical properties useful in a wide variety of superior products and applications. Regardless of these technological advances in the polyolefin industry, common problems, as well as new challenges still exist.

Advances in polymerization technology have provided more efficient, highly productive, and economically enhanced processes. Especially illustrative of these advances is the development of single site catalyst systems. Single site catalysts have been shown to be highly useful in the preparation of polyolefins, producing relatively homogeneous copolymers at good polymerization rates, allowing one to closely tailor the final properties of the polymer produced. In contrast to traditional Ziegler-Natta catalyst compositions, single site catalyst compositions comprise catalytic compounds in which each catalyst composition molecule contains one or only a few polymerization sites. Metallocenes are the most well known type of single site catalyst precursor, and are organometallic coordination complexes containing one or more pi-bonded moieties (e.g., cycloalkadienyl groups) in association with a metal atom from Groups IIIB to VIII or the Lanthanide series of the Periodic Table of Elements.

There has been tremendous focus in the industry on developing new and improved metallocene catalyst systems, designing the catalyst systems to produce new polymers, to improve operability or processability, and to improve catalyst productivity. Metallocene catalyst variables include the metal atom, the ligands or pi-bonded moieties associated with the metal atom, the type of catalyst support used, as well as any catalyst activator and the reduction ratio of the catalyst or catalyst precursors.

Unfortunately, improving upon the productivity, operability, processability, and economics of a polymerization process entails overcoming several obstacles, especially when introducing a new catalyst. A few of these issues are discussed in patents and published patent applications including: U.S. Pat. No. 6,339,134, discussing ways to improve melt properties of metallocene produce polymers; U.S. Pat. No. 6,987,152, discussing the effect of feed impurities upon the process; U.S. Pat. No. 6,914,027, discussing fines production, sheeting/fouling, and their related heat transfer problems; and U.S. Patent Application Publication No. 2005/0137364, discussing problems associated with heat removal from the polymerization reactor; each of which is hereby incorporated by reference. Each of these references, among others, describes common problems encountered and which are of concern when introducing a new catalyst to the process due to the unpredictability of results associated with a new catalyst or catalyst system.

For example, the processability of metallocene and metallocene-type catalyzed polyethylenes (mPE) is often different than polyethylenes produced in a high pressure polymerization process or with other catalysts, such as Ziegler-Natta type catalysts. For example, mPEs typically have a narrow molecular weight distribution, which tend to be more difficult to process. Generally, the broader the polymer molecular weight distribution, the easier the polymer is to process. These examples illustrate the challenges to be encountered when commercializing a new catalyst system.

Generally, these mPEs require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, mPEs exhibit many superior physical properties as compared to LDPEs.

Additionally, reactor conditions and the catalyst employed in the polymerization affect numerous physical and chemical properties of the polymer, including molecular weight, molecular weight distribution, compositional distribution, crystallinity and melting temperature, and extractable content (e.g. hexane extractables), among others. In addition to the several reactor and reactant process control variables which may be manipulated during production, polymer product properties may also vary based upon catalyst formulation and structure. The metal atom and the ligands (pi-bonded moieties) forming the metallocene complex can affect the properties of the polymer product formed. The support architecture, the number of functional groups on the support (such as —OH groups on silica), the activator loading, and the pre-impregnated catalyst loading can also affect the product formed.

End users often desire improvements or a balancing of several polymer properties. Among these are included melting point for a given density, tear properties, impact and tensile strength, heat seal and hot tack properties, and others. For example, there is a strong desire in the industry to improve heat seal and hot tack properties in PE films. It is particularly desirable to lower the heat seal temperature, broaden the hot tack window and increase the hot tack strength while maintaining low extractables to meet regulatory requirements for food packaging. These improvements are usually accomplished by lowering the density of the film resin. This, however, may negatively affect other film properties such as tear strength, dart impact strength, stiffness, and it lowers the melting temperature of the film. Additionally, to achieve good clarity, low haze, and better processability, metallocene resins are often blended with high pressure LDPE, adding to manufacturing costs.

Other background references include EP 1 300 240 A, WO 1996/00245, WO 2003/008468, WO 2003/093332, WO 2004/000919, U.S. Patent Application Publication Nos. 2005/0058847, 2005/054791, 2005/288443.

Accordingly, there exists a need for process improvements, including catalyst technology, that improve process operability, polymer properties, and/or polymer processability. There also exists a need for a metallocene catalyst that allows for increased process flexibility, where the metallocene can be used to produce multiple grades over wide density and melt flow ranges, minimizing catalyst transitions while meeting product specifications for specific end uses such as rotomolding and injection molding.

SUMMARY OF INVENTION

In one aspect, embodiments disclosed herein relate to an ethylene alpha-olefin copolymer formed by contacting at least one supported metallocene catalyst, ethylene, and an alpha-olefin in a gas phase reactor, the copolymer having the following properties: a density of between 0.890 and 0.970 g/cc; a melt index of between 0.7 and 200 dg/min; a melt index ratio of less than 30; an ESCR value of greater than 1000 hours; and a 1% secant modulus of greater than 75,000 psi.

In another aspect, embodiments disclosed herein relate to a process for the production of an ethylene alpha-olefin copolymer comprising: polymerizing ethylene and an alpha-olefin by contacting the ethylene and alpha-olefin with a metallocene catalyst in a gas phase reactor at a reactor pressure of between 0.7 and 70 bar and a reactor temperature of between 20 and 150° C. to form an ethylene alpha-olefin copolymer, wherein the ethylene alpha-olefin copolymer satisfies the following conditions: a density of between 0.890 g/cc and 0.970 g/cc; a melt index of between 0.7 dg/min and 200 dg/min; a melt index ratio of less than 30; an ECSR value of greater than 1000 hr; and an 1% secant modulus of greater than 75,000 psi.

In another aspect, embodiments disclosed herein relate to an ethylene alpha olefin copolymer, formed by contacting at least one supported metallocene catalyst, ethylene, and an alpha-olefin in a gas phase reactor, the copolymer having the following properties: a density of between 0.930 g/cc and 0.970 g/cc; a melt index of between 10 dg/min and 200 dg/min; a melt index ratio of between 10 and 25; a part weight of greater than 3 g and a part length of greater than 38 cm in a spiral flow test, and; a zero shear viscosity of less than 150 Pa·s.

In another aspect, embodiments disclosed herein relate to a process for the production of an ethylene alpha-olefin copolymer comprising: polymerizing ethylene and an alpha-olefin by contacting the ethylene and alpha-olefin with a metallocene catalyst in a gas phase reactor at a reactor pressure of between 0.7 and 70 bar and a reactor temperature of between 20 and 150° C. to form an ethylene alpha-olefin copolymer, wherein the ethylene alpha-olefin copolymer satisfies the following conditions: a density of between 0.930 g/cc and 0.970 g/cc; a melt index of between 10 dg/min and 200 dg/min; a melt index ratio of between 10 and 25; a part weight of greater than 3 g and a part length of greater than 38 cm in a spiral flow test, and; a zero shear viscosity of less than 150 Pa·s.

Other aspects and advantages of the invention will be apparent from the following description and the appended claims.

DETAILED DESCRIPTION

Figure 1:
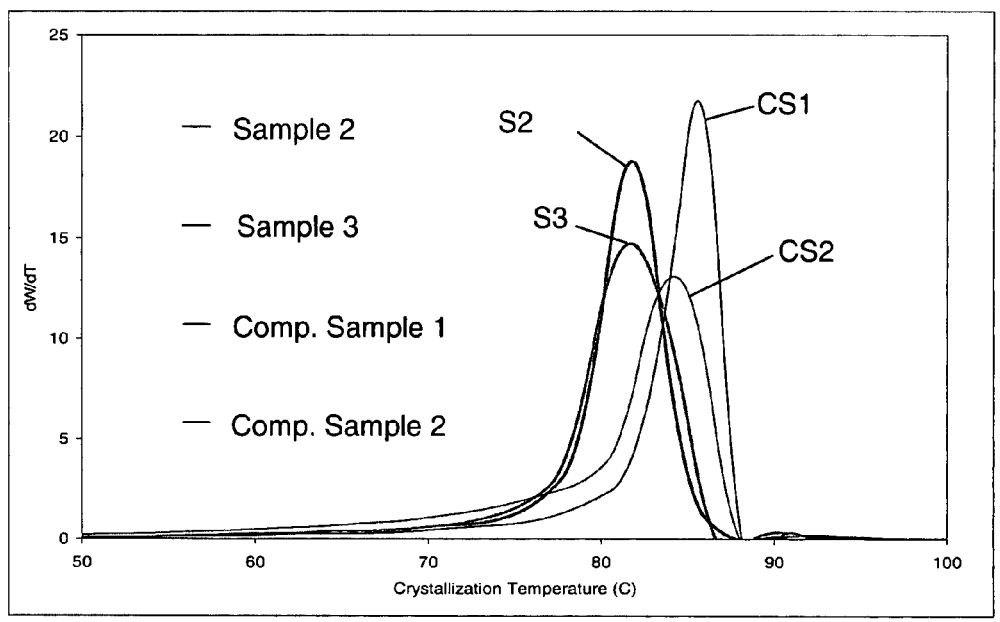
FIG. 1 presents crystallization analysis fractionation (CRYSTAF) results for embodiments of the metallocene-produced copolymer of the present invention as compared to Ziegler-Natta produced copolymers of similar density and/or melt index.

In one aspect, embodiments of the invention relate to metallocene catalysts and processes for producing a polymer. In particular, embodiments of this invention relate to improvements in the production of ethylene alpha-olefin copolymers as well as in the properties of the resulting ethylene alpha-olefin copolymer.

In other embodiments, the invention relates to metallocene catalysts and polymerization processes for producing a polymer having improved stress crack resistance. In other embodiments, the invention relates to a metallocene having improved processability. In yet other embodiments, the invention relates to a metallocene having decreased hexane extractables.

Metallocene Catalyst Compounds

The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. Hereinafter, these compounds will be referred to as "metallocenes" or "metallocene catalyst components". The metallocene catalyst component may be supported on a support material, as described further below, and may be supported with or without another catalyst component. In one embodiment, the one or more metallocene catalyst components of the invention are represented by the formula (I):

$$Cp^A Cp^B MX_n \qquad (I)$$

wherein M is a metal atom selected from the group consisting of Groups 3 through 12 atoms and lanthanide Group atoms in one embodiment. In other embodiments, M may be selected from Ti, Zr, Hf atoms. In yet other embodiments, M is hafnium (Hf). Each leaving group X is chemically bonded to M; each Cp group is chemically bonded to M; and n is 0 or an integer from 1 to 4, and either 1 or 2 in a particular embodiment.

The Cp ligands are one or more rings or ring systems, at least a portion of which includes π-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In one embodiment, $Cp^A$ and $Cp^B$ are independently selected from the group consisting of cyclopentadienyl, indenyl, tetrahydroindenyl, fluorenyl, and substituted derivatives of each. (As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.)

In one embodiment, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization. The activator is described further below.

The structure of the metallocene catalyst component may take on many forms, such as those disclosed in, for example, U.S. Pat. Nos. 5,026,798, 5,703,187 and 5,747,406, including a dimer or oligomeric structure, such as disclosed in, for example, U.S. Pat. Nos. 5,026,798 and 6,069,213. Others include those catalysts describe in published U.S. Pat. App. Nos. US20050124487A1, US20050164875A1, and US20050148744. Each of the aforementioned references is hereby incorporated by reference. In other embodiments, the metallocene may be formed with a Hafnium metal atom, such as is described in U.S. Pat. No. 6,242,545, which is hereby incorporated by reference.

In certain embodiments, the metallocene catalysts components described above may include their structural or optical or enantiomeric isomers (racemic mixture), and, in one embodiment, may be a pure enantiomer. As used herein, a single, bridged, asymmetrically substituted metallocene catalyst component having a racemic and/or meso isomer does not, itself, constitute at least two different bridged, metallocene catalyst components.

In one embodiment, the metallocene catalyst contains hafnium as the metal atom. In other embodiments, at least one of the ligands (pi-bonded moieties) contains a cyclopentadienyl group. In other embodiments, the metallocene contains a chloride leaving group. In yet other embodiments, the metallocene contains a fluoride leaving group. In yet other embodiments, the metallocene contains a methyl leaving group.

In some embodiments, the metallocene catalyst may be a bis(n-propylcyclopentadienyl)hafnium $X_n$, bis(n-butylcyclopentadienyl)hafnium $X_n$, bis(n-pentylcyclopentadienyl) hafnium $X_n$, (n-propyl cyclopentadienyl)(n-butylcyclopentadienyl)hafnium $X_n$, bis[(2-trimethylsilylethyl)cyclopentadienyl]hafnium $X_n$, bis(trimethylsilylcyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$, or combinations thereof, where $X_n$ is as described above.

In other embodiments, the metallocene catalyst may be a bis(n-propylcyclopentadienyl)hafnium dichloride, a bis(n-propylcyclopentadienyl)hafnium difluoride, or a dimethyl bis (n-propylcyclopentadienyl)hafnium.

Activator and Activation Methods for the Metallocene Catalyst Compounds

The term "activator" is defined to be any compound or component which can activate a bulky ligand transition metal metallocene-type catalyst compound as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri(n-butyl)ammonium tetrakis(pentafluorophenyl) boron or a trisperfluorophenyl boron metalloid precursor which ionize the neutral metallocene compound. A preferred activator used with the catalyst compositions of the present invention is methylaluminoxane ("MAO"). The MAO activator may be associated with or bound to a support, either in association with the catalyst component (e.g., metallocene) or separate from the catalyst component, such as described by Gregory G. Hlalky, Heterogeneous Single-Site Catalysts for Olefin Polymerization, 100(4) CHEMICAL REVIEWS 1347-1374 (2000).

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198, 401, 5,066,741, 5,206,197, 5,241,025, 5,387,568, 5,384,299 and 5,502,124, all of which are herein fully incorporated by reference. Combinations of activators are also contemplated by the invention, for example, alumoxanes and ionizing activators in combinations, see for example, PCT publications WO 94/07928 and WO 95/14044 and U.S. Pat. Nos. 5,153, 157 and 5,453,410, all of which are herein fully incorporated by reference.

Method for Supporting

A support may also be present as part of the catalyst system of the present invention. Supports, methods of supporting, modifying, and activating supports for single-site catalyst such as metallocenes are discussed in, for example, 1 METALLOCENE-BASED POLYOLEFINS 173-218 (J. Scheirs & W. Kaminsky eds., John Wiley & Sons, Ltd. 2000). The terms "support" or "carrier," as used herein, are used interchangeably and refer to any support material, including inorganic or organic support materials. In one embodiment, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one embodiment. Other useful supports include magnesia, titania, zirconia, montmorillonite (as described in EP0511665B1), phyllosilicate, and the like. In other embodiments, combinations of the support materials may be used, including, but not limited to, combinations such as silica-chromium, silica-alumina, silica-titania, and the like. Additional support materials may include those porous acrylic polymers described in EP0767184B1.

The catalyst system of the invention can be made and used in a variety of different ways. In one embodiment, the catalyst is unsupported, preferably in liquid form such as described in U.S. Pat. Nos. 5,317,036 and 5,693,727 and European publication EP-A-0593083, all of which are herein incorporated by reference. In the preferred embodiment, the catalyst system of the invention is supported. Examples of supporting the catalyst system used in the invention are described in U.S. Pat. Nos. 4,701,432, 4,808,561, 4,912,075, 4,925,821, 4,937, 217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,468,702, and 6,090,740 and PCT publications WO 95/32995, WO 95/14044, WO 96/06187, and WO 97/02297 all of which are herein fully incorporated by reference.

In another embodiment, the catalyst system of the invention contains a polymer bound ligand as described in U.S. Pat. No. 5,473,202, which is herein fully incorporated by reference. In one embodiment the catalyst system of the invention is spray dried as described in U.S. Pat. No. 5,648,310, which is fully incorporated herein by reference. In an embodiment the support of the invention is functionalized as described in European publication EP-A-0802203 or at least one substituent or leaving group is selected as described in U.S. Pat. No. 5,688,880, both of which are herein fully incorporated by reference.

In another embodiment of the invention, the supported catalyst system of the invention includes an antistatic agent or surface modifier, for example, those described in U.S. Pat. No. 5,283,278 and PCT publication WO 96/11960, which are herein fully incorporated by reference.

A preferred method for producing the catalyst of the invention can be found in WO 96/00245 and WO 96/00243, all of which are herein fully incorporated by reference.

Polymerization Process

The polymerization process of the present invention may be carried out using any suitable process, such as, for example, solution, slurry, high pressure, and gas phase. A particularly desirable method for producing polyolefin polymers according to the present invention is a gas phase polymerization process preferably utilizing a fluidized bed reactor. This type reactor, and means for operating the reactor, are well known and completely described in, for example, U.S. Pat. Nos. 3,709,853; 4,003,712; 4,011,382; 4,302,566; 4,543, 399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In general, the polymerization process of the present invention may be a continuous gas phase process, such as a fluid bed process. A fluid bed reactor for use in the process of the present invention typically has a reaction zone and a so-called velocity reduction zone. The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The process of the present invention is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

In embodiments, polyethylenes may be prepared by the process of the present invention. Such polyethylenes may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be no greater than 30 mol % in total; from 3 to 20 mol % in other embodiments. The term "polyethylene" when used herein is used generically to refer to any or all of the polymers comprising ethylene described above.

Hydrogen gas is often used in olefin polymerization to control the final properties of the polyolefin. Using the catalyst system of the present invention, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 METALLOCENE-BASED POLYOLEFINS 366-378 (John Scheirs & W. Kaminsky, eds. John Wiley & Sons, Ltd. 2000); U.S. Pat. Nos. 5,665,818, 5,677,375, and EP-A-0 794 200.

In one embodiment, the one or more reactors in a gas phase or fluidized bed polymerization process may have a pressure ranging from about 0.7 to about 70 bar (about 10 to 1000 psia); and in another embodiment a pressure ranging from about 14 to about 42 bar (about 200 to about 600 psia). In one embodiment, the one or more reactors may have a temperature ranging from about 10° C. to about 150° C.; and in another embodiment from about 40° C. to about 125° C. In one embodiment, the reactor temperature may be operated at the highest feasible temperature taking into account the sintering temperature of the polymer within the reactor. In one embodiment, the superficial gas velocity in the one or more reactors may range from about 0.2 to 1.1 meters/second (0.7 to 3.5 feet/second); and from about 0.3 to 0.8 meters/second (1.0 to 2.7 feet/second) in another embodiment.

In one embodiment of the invention, the polymerization process is a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments of the invention, one or more olefins, $C_2$ to $C_{30}$ olefins or alpha-olefins, including ethylene or propylene or combinations thereof, may be prepolymerized in the presence of the metallocene catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The present invention is not limited to any specific type of fluidized or gas phase polymerization reaction and can be carried out in a single reactor or multiple reactors such as two or more reactors in series. In embodiments, the present invention may be carried out in fluidized bed polymerizations (that may be mechanically stirred and/or gas fluidized), or with those utilizing a gas phase, similar to that as described above. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; 5,462,999; and 6,489,408, each of which is hereby incorporated by reference. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304, which is hereby incorporated by reference.

Other embodiments of the preset invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In one embodiment, a useful polymerization technique may be particle form polymerization or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 METALLOCENE-BASED POLYOLEFINS 322-332 (2000).

In one embodiment, a slurry polymerization process generally uses pressures in the range of from 1 to 50 bar and even greater, and temperatures in the range of 0° C. to 120° C. In a slurry polymerization, a suspension of solid, particulate polymer is formed in a liquid polymerization diluent medium to which ethylene and comonomers and often hydrogen along with catalyst are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms; in one embodiment, the alkane may be a branched alkane. The medium employed should be liquid under the conditions of polymerization and relatively inert. When a propane medium is used, the process must be operated above the reaction diluent critical temperature and pressure. In one embodiment, a hexane or an isobutane medium is employed.

In one embodiment of the process of the invention, the slurry or gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

As noted above, the polymerization process of the present invention may be carried out by using a solution process. Non-limiting examples of solution processes are described in, for example, U.S. Pat. Nos. 4,271,060, 5,001,205, 5,236,998, and 5,589,555.

In another embodiment, one or all of the catalysts are combined with up to 15 weight percent of a metal-fatty acid compound, such as, for example, an aluminum stearate, based upon the weight of the catalyst system (or its components), such as disclosed in, for example, U.S. Pat. Nos. 6,300,436 and 5,283,278. Other suitable metals include other Group 2 and Group 5-13 metals. In another embodiment, a solution of the metal-fatty acid compound is fed into the reactor. In another embodiment, the metal-fatty acid compound is mixed with the catalyst and fed into the reactor separately. These agents may be mixed with the catalyst or may be fed into the reactor in a solution or slurry with or without the catalyst system or its components.

The polymerization processes of the present invention use improved metallocene catalyst systems having optimized metal loading and activator concentrations. More particularly, the metallocene and activator concentrations in the improved metallocene catalyst systems of the present invention are, in one embodiment, selected so as to maximize both the catalyst activity as well as the bulk density of the polymer product, while also maximizing the operability of the catalyst.

Polymer

The polyolefins of the present invention may be blended with other polymers and/or additives to form compositions that can then be used in articles of manufacture. Those additives include antioxidants, nucleating agents, acid scavengers, plasticizers, stabilizers, anticorrosion agents, blowing agents, ultraviolet light absorbers, quenchers, antistatic agents, slip agents, pigments, dyes and fillers, and cure agents such as peroxides. These and other common additives in the polyolefin industry may be present in polyolefin compositions from 0.01 to 50 weight percent in one embodiment, and from 0.1 to 20 weight percent in another embodiment, and from 1 to 5 weight percent in yet another embodiment, wherein a desirable range may include any combination of any upper weight percent limit with any lower weight percent limit. Antioxidants and stabilizers such as organic phosphites, hindered amines, and phenolic antioxidants may be present in the polyolefin compositions of the invention from 0.001 to 5 weight percent in one embodiment, from 0.01 to 0.8 weight percent in another embodiment, and from 0.02 to 0.5 weight percent in yet another embodiment.

Fillers may be present from 0.1 to 50 weight percent in one embodiment, and from 0.1 to 25 weight percent of the composition in another embodiment, and from 0.2 to 10 weight percent in yet another embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions of the present invention. Such salts may be present from 0.001 to 2 weight percent of the composition in one embodiment, and from 0.01 to 1 weight percent in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of polyolefin and one or more additives, sufficient mixing should take place to assure that a uniform blend will be produced prior to conversion into a finished product. The polyolefin suitable for use in the present invention can be in any physical form when used to blend with the one or more additives. In one embodiment, reactor granules (defined as the granules of polymer that are isolated from the polymerization reactor) are used to blend with the additives. The reactor granules have an average diameter of from 10 microns to 5 mm; from 50 microns to 10 mm in another embodiment. Alternately, the polyolefin is in the form of pellets, such as, for example, pellets having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, BRABENDER® or any other melt blending means.

The resultant polyolefin and polyolefin compositions of the present invention may be further processed by any suitable means such as by calendering, casting, coating, compounding, extrusion, foaming; all forms of molding including compression molding, injection molding, blow molding, rotational molding (rotomolding), and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

In the case of injection molding of various articles, simple solid state blends of the pellets serve equally as well as pelletized melt state blends of raw polymer granules, of granules with pellets, or of pellets of the two components, since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polymers produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

In one embodiment, the polymers disclosed herein may have a melt index (MI or $I_2$) as measured by ASTM-D-1238-E (190° C., 2.16 kg weight) in the range from 0.01 dg/min to 1000 dg/min. In other embodiments, the polymer may have a MI from about 0.01 dg/min to about 200 dg/min; from about 0.1 dg/min to about 100 dg/min in other embodiments; and from about 0.5 dg/min to about 70 dg/min in yet other embodiments.

In one embodiment, the polymers disclosed herein may have a melt index ratio ($I_5/I_2$) ($I_5$ is measured by ASTM-D-1238-G, at 190° C., 5 kg weight) of from 5 to 300. In other embodiments, the polymer may have a melt index ratio from about 10 to less than 250; from 15 to 200 in another embodiment; and from 20 to 180 in yet another embodiment. In other embodiments the polymer may have a melt index ratio from 15 to 30; from 15 to 20 in another embodiment; from 10 to 40 in another embodiment; and from 5 to 50 in yet another embodiment.

In one embodiment, the polymers disclosed herein may have a melt flow ratio (MFR) ($I_{21}/I_2$, where $I_{21}$ is measured by ASTM-D-1238-F, at 190° C., 21.6 kg weight) of from 5 to 300; from about 10 to less than 250 in other embodiments; from 15 to 200 in yet other embodiments; and from 20 to 180 in yet another embodiment. In other embodiments the polymers may have a MFR from 15 to 30; from 10 to 40 in another embodiment; from 15 to 20 in other embodiments; and from 5 to 50 in yet another embodiment.

The polymers of the present invention have a bulk density measured in accordance with ASTM-D-1895 (Method B) that, in one embodiment, is greater than at least 0.30 grams per cubic centimeter. In another embodiment, the bulk density of the polymers is in the range of 0.30 to 0.50 grams per cubic centimeter.

Density may be measured using the test methods described in ASTM-D-4703-03 and ASTM-D-1505.

The polyolefins then can be made into films, molded articles, sheets, wire and cable coating and the like. The films may be formed by any of the conventional technique known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

Processing methods of polyolefins for molded articles are discussed in, for example, Carraher, Jr., Charles E. (1996): POLYMER CHEMISTRY: AN INTRODUCTION, Marcel Dekker Inc., New York, 512-516, herein incorporated by reference. The polyolefin compositions of the present invention are suitable for such articles as films, fibers and nonwoven fabrics, extruded articles and molded. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or nonwoven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Other desirable articles that can be made from and/or incorporate the polyolefins of the present invention include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods may be formed economically or incorporate the polyolefins produced by the practice of our invention including: crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

Polyethylenes useful for the compositions described herein may be prepared by a variety of methods. The polymerization can be conducted as solution phase processes, gas phase processes, and the like. Ethylene homopolymers and ethylene alpha-olefin copolymers useful herein may include linear polyethylenes including linear low density polyethylene (LLDPE, having a density in the range 0.918 to 0.927 g/cc, as determined in accordance with ASTM D 792), medium density polyethylene (MDPE, density from 0.927 to 0.940 g/cc), high density polyethylene (HDPE, density greater than 0.940), very low density polyethylene (VLDPE, density ranging from 0.900 to 0.918) and ultra low density polyethylene (ULDPE, density from 0.860 to 0.899 g/cc). In some embodiments, the ethylene homopolymers and ethylene alpha-olefin copolymers useful herein have a density ranging from 0.927 to 0.970 g/cc; in other embodiments, ranging from 0.930 to 0.960.

The polymers described herein typically have a weight average molecular weight to number average molecular weight ($M_w/M_n$) of greater than 1.5 to about 5, particularly greater than 2 to about 4.0, more preferably greater than about 2.2 to less than 3.5.

The polymers of the invention can have a relatively narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. CDBI is defined as the weight percent of the copolymer molecules having a comonomer content within 50% of the median total molar comonomer content. The CDBI of linear polyethylene, which does not contain a comonomer, is defined to be 100%. The CDBI is calculated from data obtained from temperature rising elution fractionation (TREF) or from crystallization analysis fractionation (CRYSTAF) as is known in the art.

During a CRYSTAF analysis (described below) of embodiments of the polymers described herein, 90% of the polymer crystallizes in a temperature interval of less than 50° C. and has a peak temperature in the CRYSTAF experiment of less than 85° C. In other embodiments, 90% of the polymer crystallizes in a temperature interval of less than 30° C. and has a peak temperature in the CRYSTAF experiment of less than 84° C. In other embodiments, 90% of the polymer crystallizes in a temperature interval of less than 20° C. and has a peak temperature in the CRYSTAF experiment of less than 84° C. In yet other embodiments, 90% of the polymer crystallizes in a temperature interval of less than 20° C. and has a peak temperature in the CRYSTAF experiment of less than 82° C.

In one embodiment, the polymers described herein may have CDBIs in the range of greater than 35% to 100%; in other embodiments from greater than 35% to about 99%; in the range of 40% to 85% in other embodiments; from 50% to 80% in yet other embodiments. In some embodiments, the polymers described herein may have a CDBI of greater than 60%; greater than 70% in other embodiments. In other embodiments, where a broad CDBI is preferred, the polymers may have a CDBI of less than 50%, less than 40%, or less than 30% in other embodiments.

In some embodiments, metallocene catalysts described herein may allow greater process flexibility. It has been found that metallocenes described herein may produce various grades covering a wide density and melt index range. In particular embodiments, there is no need to change the catalyst precursor reduction ratio and catalyst support, as is often necessary when changing between product grades produced with other metallocenes. The improved process flexibility can minimize catalyst transitions, potentially resulting in decreased off-grade production and potentially eliminating costly procedures required when transitioning catalysts.

In one embodiment, a single metallocene catalyst having a specified support and precursor reduction ratio may be used to produce multiple grades of polymers or copolymers spanning at least a density range from about 0.927 g/cc to about 0.940 g/cc; from about 0.918 g/cc to about 0.955 g/cc in other embodiments; from 0.900 g/cc to about 0.955 g/cc in other embodiments; and from about 0.890 g/cc to about 0.955 g/cc in other embodiments. In some embodiments, the multiple grades may have a melt index ($I_2$) range of from about 0.1 dg/min to about 100 dg/min; from about 1.0 dg/min to about 80 dg/min in other embodiments; and from about 1.0 dg/min to about 60 dg/min in yet other embodiments.

In other embodiments, metallocene catalysts described herein may result in products having improved properties. For example, it has been found that the optical properties, tensile strength, and puncture resistance of certain grades can be improved when produced at the higher temperatures allowed by the use of certain metallocene catalysts. Additionally, various grades of polyethylene produced using metallocenes described herein unexpectedly exhibit advantageously high stress crack resistance, more uniform machine direction/transverse direction specimens, and better processability than equivalent Ziegler-Natta grades.

For example, in one embodiment, a composition including an ethylene alpha-olefin, which has a density between about 0.912 g/cc to about 0.955 g/cc, a melt index ($I_2$) between about 0.1 to about 50 dg/min, a molecular weight distribution ($M_w/M_n$) of less than 3.5, and a melt flow ratio (MFR; $I_{21}/I_2$) of less than 25, may have an environmental stress crack resistance of greater than 1000 hours, where ESCR of a 75 mil plaque (no slit) is measured in 100% Igepal at 23° C.

In other embodiments, a composition including an ethylene alpha-olefin copolymer, which has a density between about 0.912 g/cc to about 0.965 g/cc, a melt index ($I_2$) between about 0.1 to about 100 dg/min, a molecular weight distribution ($M_w/M_n$) of less than 3.5, and a MFR ($I_{21}/I_2$) of less than 25, may have a hexane extractable content of less than 2 percent according to the FDA method (see 21 C.F.R. 177.1520, as revised Apr. 1, 2005, for details on the FDA method and requirements for food contact, repeated and while cooking).

In class of embodiments described herein, the copolymer has a hexane extractable content of 2.5 percent or less when tested in accordance with the FDA method stated in 21 C.F.R. §177.1520.

In another class of embodiments described herein, the copolymer has a hexane extractable content of 2.0 percent or less when tested in accordance with the FDA method stated in 21 C.F.R. §177.1520.

In yet another class of embodiments described herein, the copolymer has a hexane extractable content of 1.5 percent or less when tested in accordance with the FDA method stated in 21 C.F.R. §177.1520.

In other embodiments, the hexane extractables content may be less than 1.75 percent; less than 1.5 percent in other embodiments; and less than 1.4 percent in yet other embodiments.

In other embodiments, a composition including an ethylene alpha-olefin copolymer, which has a density between about 0.912 g/cc to about 0.965 g/cc, a melt index ($I_2$) between about 0.1 to about 100 dg/min, a molecular weight distribution ($M_w/M_n$) of less than 3.5, and a MFR ($I_{21}/I_2$) of less than 25, may have improved extrudability as compared to a Ziegler-Natta produced copolymer of similar density and melt index. For example, as shown by a comparison of spiral flow test data at 690 bar (10000 psi), the metallocene copolymer may have an extruded length at least 15 percent greater and a weight at least 5 percent greater than a Ziegler-Natta-produced copolymer of similar density and melt index.

In other embodiments, a composition including an ethylene alpha-olefin copolymer formed by contacting at least one supported metallocene catalyst, ethylene, and an alpha-olefin in a gas phase reactor, may have the following properties: a density of between 0.890 and 0.970 g/cc; a melt index of between 0.7 and 200 dg/min; a melt index ratio of less than 30; an ESCR value of greater than 1000 hours; and a 1% secant modulus of greater than 75,000 psi.

In other embodiments, a composition including an ethylene alpha olefin copolymer, formed by contacting at least one supported metallocene catalyst, ethylene, and an alpha-olefin in a gas phase reactor, may have the following properties: a density of between 0.930 g/cc and 0.970 g/cc; a melt index of between 10 dg/min and 200 dg/min; a melt index ratio of between 10 and 25; a part weight of greater than 3 g and a part length of greater than 38 cm in a spiral flow test, and; a zero shear viscosity of less than 150 Pa·s. In other embodiments, the zero shear viscosity may be less than 120 Pa·s.

In yet other embodiments, when the gas phase reactor is run in condensing mode, the activity of certain metallocene catalysts disclosed herein can be increased where higher levels of the condensing agent are used.

More specific embodiments of the catalyst systems and product analyses will be illustrated by the examples below.

EXAMPLES

Example 1

Three grades of various polyethylene resins used in rotomolding and injection molding applications were produced with a supported dimethyl bis(n-propylcyclopentadienyl) hafnium catalyst in a continuous polymerization reactor. The three grades had target Melt Indexes ranging from 1.5 to 80 dg/min and density targets ranging from 0.940 to 0.954 g/cc, with the resulting resins having properties as set forth in Table 1.

TABLE 1

Production Targets.

| Sample | Catalyst Type | Melt Index ($I_2$) Dg/min | Density g/cc | Targeted Application |
|---|---|---|---|---|
| 1 | Metallocene | 1.4 | 0.9445 | mHDPE; Rotomolding |
| 2 | Metallocene | 6.0 | 0.9404 | mMDPE; roto/injection molding |
| 3 | Metallocene | 80.6 | 0.9536 | mHDPE; injection molding |
| CS1 | Z-N | 6.7 | 0.9521 | HDPE; injection molding |
| CS2 | Z-N | 67.7 | 0.9530 | HDPE; injection molding |

The production of the three grades using a single catalyst and catalyst support indicated that the catalyst system was suitable for the production of various density and melt index grades (blown, cast film, rotomolding, injection molding), where there is no need to change the reduction ratio or support, as is often required during production of polyethylene, including Ziegler-Natta-catalyzed production.

Properties of each metallocene-produced polyethylene sample, including actual melt index and density of the resulting polymers, were compared to a polyethylene produced from a Ziegler-Natta catalyst, as described below (Comparative Samples 1 and 2 (CS1 and CS2)), where the comparative sample has a similar density and/or melt index. Each polymer listed in Table 1 is an ethylene-hexene copolymer.

Samples 1-3 were produced as granular resins, dry blended with 200 ppm of IRGANOX™ 1076 and 1000 ppm of zinc stearate, and pelletized. All the properties discussed in this report were subsequently established on the fully formulated resin.

Characterization of Samples 1-3 included analyses of resin intrinsic properties, product performance properties, and resin processability comparisons. Resin intrinsic properties measured included: melt flow properties; density; MWD by Size Exclusion Chromatography (SEC); comonomer branching distribution by CRYSTAF; and viscoelastic characteristics by oscillatory rheology. Product performance analyses based on plaque and injection molded specimens included: stress crack resistance (ESCR) in 100% IGEPAL (>55 dentin MI samples) and 10% IGEPAL (<10 dg/min MI samples) (tested in accordance with ASTM D-1693-B); tensile properties; 1% secant modulus (tested in accordance with ASTM D-790-99); and Izod impact. Resin processability comparisons included: spiral flow test; and hexane extractables determined by the FDA method (see 21 C.F.R. 177.1520, as revised Apr. 1, 2005, for details on the FDA method and requirements for food contact, repeated and while cooking).

Melt Flow Properties and Processability

Comonomer branching distribution (composition distribution) was measured in a commercial CRYSTAF instrument (Model 200, PolymerChar S.A.). Approximately 20-30 mg of polymer were dissolved in 30 mL of 1,2 dichlorobenzene (ODCB, Aldrich 99+ % stabilized with 0.5 g BHT/4 L) at 160° C. for 60 minutes followed by 45 minutes equilibration time at 100° C. The polymer solutions were then cooled to 0° C. using a crystallization rate of 0.2 K/min (0.2° C./min). A two wavelength infrared detector was used to measure the polymer concentration during crystallization (3.5 μm, 2853 $cm^{-1}$ sym. stretch) and to compensate for base line drifts (3.6 μm) during the analysis time. The solution concentration was monitored at certain temperature intervals, yielding a cumulative concentration curve. The derivative of this curve with respect to temperature represents the weight fraction of crystallized polymer at each temperature.

CRYSTAF results for Sample 2 and Sample 3 are compared to CS1 and CS2, respectively, in FIG. 1. The CRYSTAF results show a great resemblance of the metallocene roto- and injection molding products to the Z-N controls. The breadth of the relative peaks was similar, although the peak crystallization temperature of the metallocene produced Samples 2 and 3 were slightly lower than the Ziegler-Natta catalyzed Comparative Samples 1 and 2 (CS1 and CS2).

Intrinsic properties measured for Samples 2 and 3 are compared to CS1 and CS2 in Table 2. The molecular weight distribution (Mw/Mn) and the melt flow ratio (MFR) ($I_{21}/I_2$) were narrower for the metallocene-produced samples than with the Ziegler-Natta-produced comparative samples.

TABLE 2

Resin intrinsic properties.

| | Sample | | | |
|---|---|---|---|---|
| | CS1 | 2 | CS2 | 3 |
| $I_2$ (dg/min) | 6.67 | 6.03 | 67.70 | 80.56 |
| $I_{21}$ (dg/min) | 151.35 | 104.16 | 1604.60 | 1520.95 |
| MFR ($I_{21}/I_2$) | 22.68 | 17.26 | 23.70 | 18.88 |
| $I_5$ (dg/min) | 18.91 | 15.68 | 195.75 | 209.83 |
| MFR ($I_{21}/I_5$) | 8.00 | 6.64 | 8.20 | 7.25 |
| Density (g/cc) | 0.9521 | 0.9404 | 0.9530 | 0.9536 |
| Mn | 16,342 | 32,673 | 8,191 | 14,452 |
| Mw | 76,205 | 70,731 | 14,169 | 37,366 |
| Mz | 251,185 | 131,887 | 148,142 | 69,154 |
| Mw/Mn | 4.66 | 2.16 | 5.02 | 2.59 |
| CRYSTAF Peak Temperature | 85.6 | 81.8 | 84.3 | 81.8 |
| DSC Peak Melt Temperature (° C.) | 132.2, single peak | 127.3, single peak | 130.3, single peak | 129.6, single peak |
| Zero Shear Viscosity, $\eta_0$ (Pa-s) | 1166 | 1190 | 119 | 85 |

Spiral flow test data (tested in accordance with ASTM D3123-98) obtained at two pressure settings indicate changes in weight and length of the spiral parts made with similar melt index resins. A greater length and weight indicate improved processability (an improved ability of the melt to flow at similar temperatures and pressures), and the materials may allow injection molders to achieve easier mold fills, shorter cycle times and effect overall energy savings. The processability of lower molecular weight ($I_2$>55 dg/min) improved, as shown in Table 3. The high melt index resins show improved processability as compared to the Ziegler-Natta-produced comparative sample, even though the mPEs had a narrower MFR.

TABLE 3

Spiral flow test data for the high melt index resins.

|  | Sample | |
|---|---|---|
|  | CS2 | 3 |
| $I_2$ (dg/min) | 67.70 | 80.56 |
| MFR | 23.7 | 18.9 |
| Density (g/cc) | 0.953 | 0.954 |
| Injection Pressure: 690 bar (10,000 psi) | | |
| Length (cm) | 33.0 | 39.0 |
| Part weight (g) | 2.88 | 3.15 |
| Injection Pressure: 1035 bar, (15,000 psi) | | |
| Length (cm) | 43.0 | 49.0 |
| Part Weight (g) | 3.40 | 3.67 |

The viscoelastic behavior of the metallocene produced samples was tested using a dynamic stress rheometer. Although Sample 3 showed better flowability as compared to CS2 (as evidenced by the spiral flow data in Table 3), Sample 3 showed very similar behavior in oscillatory shear rheology experiments compared to CS2.

Products Performance Based on Plaque Properties

The performance of many injection molding products is determined by impact resistance, stiffness, and environmental stress crack resistance (ESCR). In this study each of the resins was made into two types of specimen plaques, one injection molded and the other compression molded under ASTM conditions. Use of the different samples allowed for comparison of the process variable effects on the product properties (such as shear flow affecting MD/TD orientation, cooling and solidification affecting crystallinity). Test results on the injection molded samples (IM) and ASTM compression molded samples (ASTM) are presented in Table 4. All samples had a thickness of 125 mil, except for the ESCR plaques, which had a thickness of 75 mil.

TABLE 4

Plaque properties.

| | Preparation Method | | | | | |
|---|---|---|---|---|---|---|
| | IM | | | ASTM | | |
| | Sample | | | | | |
| | CS1 | 2 | 1 | CS1 | 2 | 1 |
| Melt Index, $I_2$ (dg/min) | 6.67 | 6.03 | 1.43 | 6.67 | 6.03 | 1.43 |
| Density (g/cc) | 0.952 | 0.940 | 0.9445 | 0.952 | 0.940 | 0.9445 |
| ESCR (hr) | | | | | | |
| 100% IGEPAL, no slit, 23° C., 75 mil plaque | 53 | >1000 | >1000 | 193 | >1000 | >1000 |

The mPE Sample 2 exhibited excellent stress crack resistance, even considering it has a lower density than Ziegler-Natta produced CS2. This particular feature is valuable in fuel tanks and other types of containers that require good resistance to various chemicals. Sample 1, having a lower melt flow and a density intermediate that of CS1 and Sample 2, also exhibited excellent stress crack resistance.

As mentioned earlier, Sample 3 exhibited better processability than CS2. Sample 3 also has similar mechanical properties as CS2, as shown in Table 5.

TABLE 5

Plaque properties for the high melt index resins.

| | Preparation Method | | | |
|---|---|---|---|---|
| | IM | | ASTM | |
| | Sample | | | |
| | CS2 | 3 | CS2 | 3 |
| MI (dg/min) | 67.7 | 80.6 | 67.7 | 80.6 |
| Density (g/cc) | 0.953 | 0.954 | 0.953 | 0.954 |
| Tensile Properties | | | | |
| Peak Load, N (lbf) | 418.6 | 464.8 | 523.6 | 448.4 |
| | (94.1) | (104.5) | (117.7) | (100.8) |
| Peak Stress, bar (psi) | 206.8 | 230.7 | 255.4 | 241.0 |
| | (2,998) | (3,345) | (3,704) | (3,484) |
| Break Stress, bar (psi) | 206.8 | 230.7 | 253.4 | 230.4 |
| | (2,998) | (3,345) | (3,675) | (3,341) |
| Strain at Break (%) | 6.1 | 8.8 | 10.3 | 10.3 |
| Energy to break, N-m | 0.88 | 1.54 | 2.16 | 2.24 |
| (in * lbf) | (7.8) | (13.6) | (19.1) | (19.8) |

TABLE 5-continued

Plaque properties for the high melt index resins.

| | Preparation Method | | | |
|---|---|---|---|---|
| | IM | | ASTM | |
| | Sample | | | |
| | CS2 | 3 | CS2 | 3 |
| Secant Modulus | | | | |
| Load @ 1%, N (lbf) | 319.8 | 321.2 | 390.1 | 371.0 |
| | (71.9) | (72.2) | (87.7) | (83.4) |
| 1% Secant Modulus, bar (psi) | 6846 | 7888 | 9783 | 10273 |
| | (99,262) | (114,371) | (141,859) | (148,968) |
| Load @ 2%, N (lbf) | 480.9 | 482.6 | 598.3 | 556.5 |
| | (108.1) | (108.5) | (134.5) | (125.1) |
| 2% Secant Modulus, bar (psi) | 5158 | 5912 | 7510 | 7708 |
| | (74,788) | (85,724) | (108,891) | (111,763) |
| Flexural Modulus | | | | |
| Break Load, N (lbf) | 44.9 | 44.9 | 46.3 | 44.0 |
| | (10.1) | (10.1) | (10.4) | (9.9) |
| Break Stress, bar (psi) | 263.5 | 263.5 | 316.1 | 336.0 |
| | (3,821) | (3,821) | (4,583) | (4,872) |
| Flexuaral Modulus, bar (psi) | 8452 | 8572 | 11086 | 12809 |
| | (122,556) | (124,299) | (160,745) | (185,740) |
| Izod Impact | | | | |
| Izod Impact at 23° C., J/m (ft-lbs/in) | 22.0 | 24.5 | 20.4 | 22.2 |
| | (0.41) | (0.46) | (0.38) | (0.42) |
| Izod Impact at −40° C., J/m (ft-lbs/in) | 23.8 | 27.5 | 22.9 | 19.2 |
| | (0.45) | (0.52) | (0.43) | (0.36) |

Hexane Extractables by FDA Method

FDA regulations for food packaging require the level of hexane extractables be below 5.3% for general use and below 2.5% for "boil in bag" application. While high melt index, medium to low density products made with Z-N catalysts typically fulfill the first requirement, often by shifting density and/or changing the comonomer type, their intrinsic properties impede the 2.5% threshold. The metallocenes described herein may be able to deliver products in a wide range of melt indicia and densities without any FDA constraints related to the levels of hexane extractables, including the more stringent "boil in bag" restriction. In some embodiments, the metallocenes described herein may have a hexane extractable content of less than 2 percent according to the FDA method (see 21 C.F.R. 177.1520, as revised Apr. 1, 2005, for details on the FDA method and requirements for food contact, repeated and while cooking). In other embodiments, the hexane extractables content may be less than 1.75 percent; less than 1.5 percent in other embodiments; and less than 1.4 percent in yet other embodiments.

Overall, the metallocene resins evaluated have a higher peak melting point temperature and a narrower MWD than comparable Z-N products. The difference in MWD may impede injection molding extrusion of low melt index (~6 dg/min) resins. The low melt index metallocene grades exhibit advantageous high stress crack resistance (>1000 hr). And, a low level of hexane extractables in metallocene LLDPE products may open a new market in food packaging that currently is not available to many Z-N products.

Advantageously, in at least one embodiment, the present invention provides for a metallocene catalyst system useful for the production of polyethylenes having improved physical and chemical properties as well as enhanced processability. Additionally, the metallocene catalyst system may allow improved separations, yielding a polymer suitable for many applications having stringent FDA standards for polymer extractables content.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed is:

1. An ethylene alpha-olefin copolymer formed by contacting at least one supported metallocene catalyst, ethylene, and at least one other alpha-olefin in a gas phase reactor, the copolymer having the following properties:
   i. a density of from 0.940 to 0.954 g/cc;
   ii. a melt index $I_2$ of from 1.5 to 80 dg/min;
   iii. a melt index ratio $MI_{21}/MI_2$ of 20 or less;
   iv. an ESCR value of 1000 hours or greater; and
   v. a 1% secant modulus of 75,000 psi or greater,
   wherein the metallocene is bis(n-propylcyclopentadienyl) hafnium $X_n$,
   wherein X is selected from $C_{1-12}$ alkyls; and
   wherein n is zero or an integer from 1 to 4.

2. The ethylene alpha olefin copolymer of claim 1, wherein the ethylene alpha olefin copolymer has a melt index ratio $MI_{21}/MI_2$ of from 15 to 20.

3. The ethylene alpha olefin copolymer of claim 1, wherein the ethylene alpha olefin copolymer has, a hexane extractable content of 2.0 or less weight percent.

4. The ethylene alpha olefin copolymer of claim 1, wherein the ethylene alpha olefin copolymer has a hexane extractable content of 1.5 or less weight percent.

5. The ethylene alpha olefin copolymer of claim 1, wherein the ethylene alpha olefin copolymer has a hexane extractable content of 1.4 or less weight percent.

6. A composition comprising the ethylene alpha olefin copolymer of claim 1.

7. An article formed by rotational molding the composition of claim 6.

8. The ethylene alpha olefin copolymer of claim 1, wherein by CRYSTAF analysis 90% of the ethylene alpha olefin copolymer crystallizes in a temperature interval of 50° C. or less and has a peak temperature in the CRYSTAF experiment of 85° C. or less.

9. The ethylene alpha olefin copolymer of claim 1, wherein by CRYSTAF analysis 90% of the ethylene alpha olefin copolymer crystallizes in a temperature interval of 30° C. or less and has a peak temperature in the CRYSTAF experiment of 84° C. or less.

10. The ethylene alpha olefin copolymer of claim 1, wherein by CRYSTAF analysis 90% of the ethylene alpha olefin copolymer crystallizes in a temperature interval of 20° C. or less and has a peak temperature in the CRYSTAF experiment of 84° C. or less.

11. The ethylene alpha olefin copolymer of claim 1, wherein by CRYSTAF analysis 90% of the ethylene alpha olefin copolymer crystallizes in a temperature interval of 20° C. or less and has a peak temperature in the CRYSTAF experiment of 82° C. or less.

12. A process for the production of an ethylene alpha-olefin copolymer comprising: polymerizing ethylene and an alpha-olefin by contacting the ethylene and at least one other alpha-olefin with a metallocene catalyst in a gas phase reactor at a reactor pressure of from 0.7 to 70 bar and a reactor temperature of from 20 to 150° C. to form an ethylene alpha-olefin copolymer, wherein the ethylene alpha-olefin copolymer satisfies the following conditions:
   a. a density of from 0.940 to 0.954 g/cc;;
   b. a melt index $I_2$ of from 1.5 to 80 dg/min;
   c. a melt index ratio $MI_{21}/MI_2$ of 20 or less;
   d. an ECSR value of 1000 hr or greater, and
   e. an 1% secant modulus of 75,000 psi or greater,
   wherein the metallocene is bis(n-propylcyclopentadienyl) hafnium $X_n$;
   wherein X is selected from $C_{1-12}$ alkyls; and
   wherein n is zero or an integer from 1 to 4.

13. The process of claim 12, wherein the ethylene alpha olefin copolymer has a melt index ratio $MI_{21}/MI_2$ of from 15 to 20.

14. The process of claim 12, wherein the ethylene alpha-olefin copolymer has a hexane extractable content of 2.0 weight percent or less.

15. The process of claim 12, wherein the at least one supported metallocene catalyst is supported with silica.

16. The process of claim 12, wherein the at least one supported metallocene catalyst is contacted with at least one an activator.

17. The process of claim 16, wherein the activator is an alumoxane.

18. An ethylene alpha olefin copolymer, formed by contacting at least one supported metallocene catalyst, ethylene, and an alpha-olefin in a gas phase reactor, the copolymer having the following properties:
   a. a density of from 0.930 g/cc to 0.970 g/cc;
   b. a melt index $I_2$ of from 10 dg/min to 200 dg/min;
   c. a melt index ratio $MI_{21}/MI_2$ of from 10 to 20;
   d. a part weight of 3 g or greater and a part length of 38 cm or greater in a spiral flow test, and;
   e. a zero shear viscosity of 150 Pa·s or less,
   wherein the metallocene is bis(n-propylcyclopentadienyl) hafnium $X_n$;
   wherein X is selected from $C_{1-12}$ alkyls; and
   wherein n is zero or an integer from 1 to 4.

19. The ethylene alpha olefin copolymer of claim 18, wherein said ethylene alpha olefin copolymer has a melt index ratio $MI_{21}/MI_2$ of from 15 to 20.

20. The ethylene alpha olefin copolymer of claim 18, wherein said ethylene alpha olefin copolymer has a hexane extractable content of 2.0% or less.

21. The ethylene alpha olefin copolymer of claim 18, wherein said ethylene alpha olefin copolymer has a hexane extractable content of 1.5% or less.

22. The ethylene alpha olefin copolymer of claim 18, wherein said ethylene alpha olefin copolymer has a hexane extractable content of 1.4% or less.

23. A composition comprising the ethylene alpha olefin copolymer of claim 18.

24. An article formed by injection molding the composition of claims 23.

25. The ethylene alpha olefin copolymer of claim 18, wherein the zero shear viscosity is 120 Pa·s or less.

26. The ethylene alpha olefin copolymer of claim 18, wherein by CRYSTAF analysis 90% of the ethylene alpha olefin copolymer crystallizes in a temperature interval of 50° C. or less and has a peak temperature in the CRYSTAF experiment of 85° C. or less.

27. The ethylene alpha olefin copolymer of claim 18, wherein by CRYSTAF analysis 90% of the ethylehe alpha olefin copolymer crystallizes in a temperature interval of 30° C. or less and has a peak temperature in the CRYSTAF experiment of 84° C. or less.

28. The ethylene alpha olefin copolymer of claim 18, wherein by CRYSTAF analysis 90% of the ethylene alpha olefin copolymer crystallises in a temperature interval of 20° C. or less and has a peak temperature in the CRYSTAF experiment of 84° C. or less.

29. The ethylene alpha olefin copolymer of claim 18, wherein by CRYSTAF analysis 90% of the ethylene alpha olefin copolymer crystallizes in a temperature interval of 20° C. or less and has a peak temperature in the CRYSTAF experiment of 82° C. or less.

30. A process for the production of an ethylene alpha-olefin copolymer comprising: polymerizing ethylene and an alpha-olefin by contacting the ethylene and at least one other alpha-olefin with a metallocene catalyst in a gas phase reactor at a reactor pressure of from 0.7 to 70 bar and a reactor temperature of from 20 to 150° C. to form an ethylene alpha-olefin copolymer, wherein the ethylene alpha-olefin copolymer satisfies the following conditions:
   a. a density of from 0.930 g/cc to 0.970 g/cc;
   b. a melt index $I_2$ of from 10 dg/min to 200 dg/min;
   c. a melt index ratio $MI_{21}/MI_2$ of from 10 to 20;
   d. a part weight of 3 g or greater and a part length of 38 or greater cm in a spiral flow test, and;
   e. a zero shear viscosity of 150 Pa·s or less;
   wherein the metallocene is bis(n-propylcyclopentadienyl) hafnium $X_n$;
   wherein X is selected from $C_{1-12}$ alkyl; and
   wherein n is zero or an integer from 1 to 4.

31. The process of claim 30, wherein the metallocene catalyst is contacted with at least one support material.

32. The process of claim 30, wherein the metallocene catalyst is contacted with at least one activator.

33. The process of claim 32, wherein the activator is an alumoxane.

* * * * *